(12) United States Patent
Ihlenfeldt et al.

(10) Patent No.: US 11,035,659 B2
(45) Date of Patent: *Jun. 15, 2021

(54) INERTIAL DIMENSIONAL METROLOGY

(71) Applicants: Steven Eugene Ihlenfeldt, Mercer Island, WA (US); Edward A. Ingham, Somerville, TN (US)

(72) Inventors: Steven Eugene Ihlenfeldt, Mercer Island, WA (US); Edward A. Ingham, Somerville, TN (US)

( * ) Notice: Subject to any disclaimer, the term of this patent is extended or adjusted under 35 U.S.C. 154(b) by 93 days.

This patent is subject to a terminal disclaimer.

(21) Appl. No.: 16/661,762

(22) Filed: Oct. 23, 2019

(65) Prior Publication Data
US 2020/0056874 A1 Feb. 20, 2020

Related U.S. Application Data

(63) Continuation of application No. 15/418,444, filed on Jan. 27, 2017, now Pat. No. 10,545,014, which is a continuation of application No. 14/556,301, filed on Dec. 1, 2014, now Pat. No. 9,557,157.

(51) Int. Cl.
*G01B 5/008* (2006.01)
*G01B 11/00* (2006.01)
*G01C 3/08* (2006.01)

(52) U.S. Cl.
CPC ............ *G01B 5/008* (2013.01); *G01B 11/005* (2013.01); *G01C 3/08* (2013.01)

(58) Field of Classification Search
CPC ........... G01B 5/008; G01B 11/05; G01C 3/08
USPC .......................................................... 33/503
See application file for complete search history.

(56) References Cited

U.S. PATENT DOCUMENTS

| | | | |
|---|---|---|---|
| 5,583,776 | A | 12/1996 | Levi et al. |
| 6,163,973 | A | 12/2000 | Matsumiya et al. |
| 6,266,628 | B1 | 7/2001 | Huep et al. |
| 6,453,239 | B1 | 9/2002 | Shirasaka et al. |
| 6,834,234 | B2 | 12/2004 | Scherzinger et al. |
| 6,853,909 | B2 | 2/2005 | Scherzinger |
| 7,230,689 | B2 | 6/2007 | Lau |
| 8,006,398 | B2 | 8/2011 | McFarland et al. |

(Continued)

FOREIGN PATENT DOCUMENTS

| | | |
|---|---|---|
| EP | 0481307 A2 | 4/1992 |
| WO | 2009026642 A1 | 3/2009 |

OTHER PUBLICATIONS

Honeywell Aerospace, "HG9900 IMU," Sep. 3, 2009, two pages, www.honeywell.com.

(Continued)

*Primary Examiner* — George B Bennett
(74) *Attorney, Agent, or Firm* — George C. Rondeau, Jr.; Davis Wright Tremaine LLP

(57) ABSTRACT

A method of performing dimensional metrology of an object (12) includes incorporating an Inertial Measurement Unit (IMU-18) with an elongate probe (20) in a portable metro-probe (10). A tip (22) of the probe (20) has an offset length (L) from an origin (26) of a coordinate system in the IMU (18) and position (X,Y,Z) thereof is correlated based on attitude (A,B,C) measurement of the IMU (18). The metro-probe (10) is transported in sequence to a complement of survey points (Pn) on the object (12) for measuring corresponding coordinates (X,Y,Z) thereof based on measured attitude (A,B,C) of the IMU (18).

46 Claims, 6 Drawing Sheets

(56) References Cited

U.S. PATENT DOCUMENTS

| | | | |
|---|---|---|---|
| 8,060,344 B2 | 11/2011 | Stathis | |
| 8,416,130 B2 | 4/2013 | Scherzinger | |
| 8,453,340 B2* | 6/2013 | van der Merwe | G05B 15/02 |
| | | | 33/512 |
| 8,724,119 B2 | 5/2014 | Steffey et al. | |
| 9,557,157 B2 | 1/2017 | Ihlenfeldt et al. | |
| 10,545,014 B2* | 1/2020 | Ihlenfeldt | G01B 5/008 |
| 2005/0166413 A1 | 8/2005 | Crampton | |
| 2010/0149525 A1 | 6/2010 | Lau | |
| 2011/0119025 A1 | 5/2011 | Fetter et al. | |
| 2012/0079731 A1 | 4/2012 | Ruck | |
| 2014/0157610 A1 | 6/2014 | Garvey et al. | |
| 2015/0300798 A1 | 10/2015 | Pettersson et al. | |
| 2016/0153767 A1* | 6/2016 | Ihlenfeldt | G01C 3/08 |
| | | | 33/503 |
| 2016/0195389 A1 | 7/2016 | Sagemueller et al. | |
| 2016/0223316 A1 | 8/2016 | Jordil et al. | |
| 2020/0049498 A1* | 2/2020 | Rees | G01B 21/045 |

OTHER PUBLICATIONS

Vectornav Technologies LLC, "VN-100 IMU/AHRS," Oct. 14, 2014, nine pages, www.vectornav.com.

Epson, "New Epson Inertial Measurement Unit Offers World Class Energy Consumption and Size, " Jun. 6, 2011, five pages, www.global.epson.com.

Woodman, O.J., "An Introduction to Inertial Navigation, " Aug. 2007, Technical Report No. 696, University of Cambridge Computer Laboratory, United Kingdom, 37-pages.

Zupt LLC, "Inertial Positioning Technology." Oct. 14, 2014, 51-pages, www.zupt.com.

Li et al, "Zero Velocity Update with Stepwise Smoothing for Inertial Pedestrian Navigation," International Global Navigation Satellite Systems Society, IGNSS Symposium, Jul. 16-18, 2013, Australia, 10 pages.

Abdulrahim et al, "Understanding the Performance of Zero Velocity Updates in MEMS-based Pedestrian Navigation," International Journal of Advancements in Technnology, vol. 5, No. 2, Mar. 2014, 8-pages.

Hexagon Metrology, "Leica Absolute Tracker AT402," Product Brochure, Apr. 2014, Germany, www.leica-geosystems.us, 20-pages.

Faro Technologies Inc, "FARO Laser Tracker ION (tm)," Product Literature, Nov. 3, 2009, 21-pages, www.faro.com.

Applanix, "POS/LS" Surveying without Boundries, product brochure, Ontario, Canada, 2001, 3 pages, www.applanix.com.

Reutebuch et al, "A Test of the Applanix POS LS Inertial Positioning System for the Collection of Terrestrial Coordinates under a Heavy Forest Canopy," Jun. 9, 2003, http://www.sefs.washington.edu/research.pfc/pdf/Reutebuch_Applanix_paper6_9_03_pdf.

Automated Precision Inc, "Active Target I Smart Track," product brochure information, 2010, Rockville, MD, 7-pages, www.apisensor.com.

Automated Precision Inc, "I-Probe Wireless," product brochure information, 2013, Rockville, MD, 5-pages, www.apisensor.com.

* cited by examiner

INERTIAL DIMENSIONAL METROLOGY

BACKGROUND OF THE INVENTION

The present invention relates generally to dimensional metrology and, more specifically, to large volume physical measurement of three dimensional (3D) objects.

Dimensional Metrology is the science of calibrating and using physical measurement equipment to quantify the physical size of, or distance from, any given object. Inspection is a critical step in product development and quality control.

Dimensional Metrology requires the use of a variety of physical scales to determine dimensions, with the most accurate of these being holographic etalons or laser interferometers. The realization of dimensions using these accurate scale technologies is the end goal of dimensional metrologists.

Modern measurement equipment include hand tools, Coordinate-Measurement Machines (CMMs), machine vision systems, laser trackers, and optical comparators. A CMM is based on CNC technology to automate measurement of Cartesian coordinates using a touch probe, contact scanning probe, or non-contact sensor.

Optical comparators are used when physically touching the part is undesirable. Optical comparators can now build 3D models of a scanned part and internal passages using x-ray technology.

Furthermore, optical 3D laser scanners are becoming more common. By using a light sensitive detector (e.g. digital camera) and a light source (laser, line projector) the triangulation principle is employed to generate 3D data, which is evaluated in order to compare the measurements against nominal geometries either in a scale drawing or CAD Model.

In some cases, the object to be measured is transported to an area with stationary measuring devices for measurement. Typically in large volume dimensional metrology, portable measuring devices are transported to the large object for measurement.

Large volume metrology examples include precision measurement of aircraft and spacecraft, energy generation structures and devices, and large manufacturing and assembly facilities.

The CMM is a very powerful measuring device used in dimensional metrology because it simultaneously produces coordinates of a point on the object being measured based on a reference location of the CMM using a suitable coordinate system like the three orthogonal axis Cartesian coordinates X, Y, and Z having a common reference origin.

The laser tracker is a popular portable CMM that can calculate X,Y,Z coordinates for any point on an object. This is accomplished by measuring the distance between the tracker and each target point with a laser and combining it with the horizontal and vertical angles of the laser pointing device embodied in the tracker using a common reference coordinate systems for all points in the measurement survey.

An optical target in the exemplary form of a Spherically Mounted Retro-reflector (SMR) is placed at the desired point on the object for the laser tracker to precisely determine laser range and fix horizontal and vertical angles of the emitted laser beam in the pointing device.

Other portable CMMs include theodolites, robotic total stations, and a system of camera photos called photogrammetry. They all require Line of Site (LOS) between the portable CMM and the target point on the object they are measuring.

Since ultimately all the desired points measured on the 3D object need to be plotted in their exact relationship with each other in a suitable coordinate system, and because the CMM will most likely not have visibility on all the desired points from one location, the LOS requirement becomes a significant problem.

In large volume metrology, the object being surveyed is typically large in three dimensions and typically complex in configuration, and may therefore include a significant number of recessed or obstructed target points hidden from LOS view of the CMM within the full complement of desired survey locations or points.

However, because this type of CMM is portable, the CMM can be relocated to a new LOS reference location, or a second CMM may be used, for providing LOS measurements of survey points previously hidden at the first CMM location. CMM measurements from both viewing or source locations will therefore include both survey points with LOS coordinate measurements thereof, and other survey points hidden from LOS view of the differently located CMMs.

Since the two CMM viewing locations will have different coordinate references, a mathematical work-around to the LOS requirement, such as least squares optimization, may be used to mathematically tie together the measured coordinates based on some of the common survey points having LOS visibility from both CMM viewing locations to establish a common coordinate reference system for all measured points from both viewing locations.

Other solutions for measuring hidden points lacking LOS visibility include special optical targets cooperating with the CMM that include touch probes that can reach the hidden points while at least some portion of the probe remains within LOS visibility of the CMM.

However, such optical targets probes can have various configurations including different benefits and different problems in measuring the hidden survey point.

Significant to large scale dimensional metrology is the typical requirement for precision measurement of the 3D object coordinate locations X,Y,Z within very small dimensional tolerances of about plus/minus 0.6 mils (0.0006 inches or 15 microns), for example.

The typical laser tracker CMM can achieve this high precision; and highly specialized optical targets may be used therewith for matching such high precision based on different technologies having different problems and different benefits, and at correspondingly different cost.

Various optical targets and probes are known for various fields of endeavor including land surveying, and vary substantially in configuration and operation, with correspondingly different accuracy of measurement.

Fundamental to metrology are the typical six degrees of freedom (DOF) associated with 3D objects, which can be measured in a suitable coordinate system such as the exemplary six-axis Cartesian coordinate system introduced above. Three orthogonal linear axes X, Y, and Z extend outwardly from a common origin for defining linear position therefrom; and three angular or rotary axes A, B, C define angular position or attitude around the corresponding linear axes, commonly known as roll, pitch, and yaw.

Various technologies are commonly known for measuring linear position and angular attitude with varying degrees of complexity and accuracy. And, such various technologies may be combined in various manners for various benefits.

Many common measuring technologies are based on optical measurements having various optical encoders or camera systems, which require LOS. Other technologies include the Global Positioning Satellite (GPS) system commonly used in navigation for measuring or determining location based on longitude and latitude positions, but subject to the substantial problem of GPS signal loss.

Still other technologies include the Inertial Measurement Unit (IMU) also commonly used in navigation in which cooperating accelerometers and gyroscopes measure relative movement of the IMU in the six DOF, but subject to the also significant problem of inherent temporal drift errors.

All such measuring technologies have different capabilities and different problems, and correspondingly different costs.

For example, fundamental to IMUs is the significant drift errors inherent therein which increase exponentially, or quadratically, with time. Accordingly, commercial inertial sensors based on IMUs have a six-order magnitude difference in price and performance in different configurations or grades thereof.

Four IMU grades include automotive & consumer; industrial; tactical; and marine & navigation having correspondingly decreasing drift errors resulting in horizontal position errors of about 7900 km/hr, 190 km/hr, 19 km/hr, and 1.6 km/hr, respectively, with cost ranging from low for consumer grade to exceedingly high for the marine grade.

However, one particular advantage of IMUs is their dead-reckoning capability to measure both linear and angular positions without regard to the loss of LOS or GPS signal problems. Another particular advantage of IMUs is modern advancements thereto in which the size, cost, and drift errors of IMUs continue to decrease.

Accordingly, one object of the present invention is to provide improved large volume dimensional metrology of an object.

Another object of the invention is to provide an improved method for measuring location of one or more of the full complement of survey points having blocked LOS in a measurement survey of the object.

Another object of the invention is to provide location measurement of the hidden point with preferential precision thereof.

Another object of the invention is to provide an improved method and system for conducting large volume dimensional metrology having reduced complexity and cost.

BRIEF DESCRIPTION OF THE INVENTION

A method of performing dimensional metrology of an object includes incorporating an Inertial Measurement Unit (IMU) with an elongate probe in a portable metroprobe. A tip of the probe has an offset length from an origin of a coordinate system in the IMU and position thereof is correlated based on attitude measurement of the IMU. The metroprobe is transported in sequence to a complement of survey points on the object for measuring corresponding coordinates thereof based on measured attitude of the IMU.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
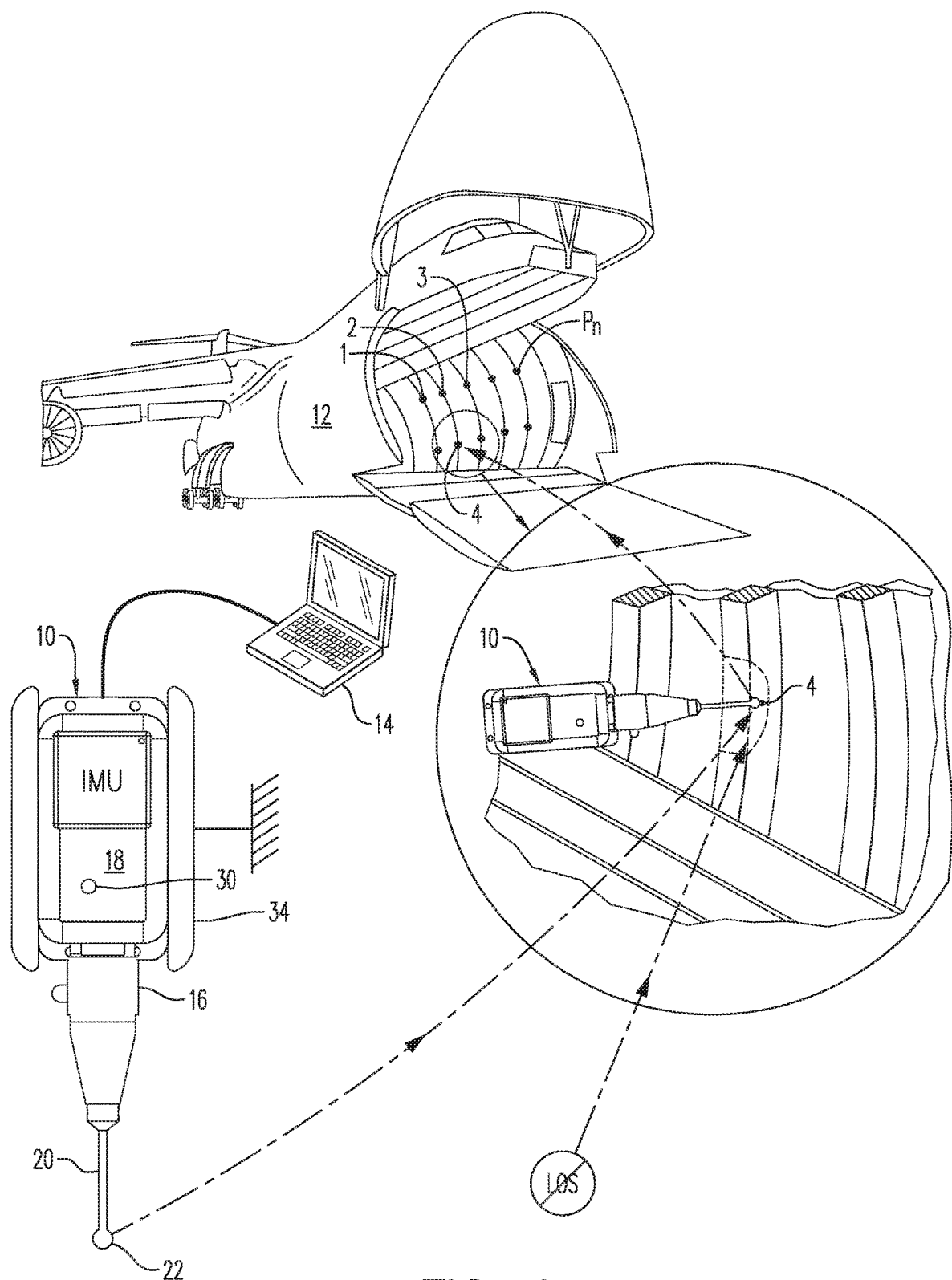
FIG. 1 is an elevational isometric view of a survey system using an inertial metroprobe for performing large volume dimensional metrology on a large object.

Illustrated in FIG. 1 is a metrology probe, or metroprobe, 10 specifically configured for conducting large volume dimensional metrology of an object 12, such as the exemplary cargo aircraft.

In large volume dimensional metrology, a preferential complement or set of measurement points Pn are suitably selected on the object, and may have any desired quantity or number, with n ranging in value from 1, 2, 3, . . . to N, where N is the total number of measurement or survey points Pn desired. The survey points Pn correspond with various point locations on the object 12 for which precise coordinate locations thereof are desired.

The metroprobe 10 may be controlled and functionally operated by using a suitable controller 14, such as a digitally programmable laptop computer, operatively joined thereto by either an electrical cord or by wireless communication using a standard Wireless Local Area Network (WLAN) having suitable WLAN adapters in both devices.

The metroprobe 10 includes a suitable housing or body 16 in which are structurally supported or integrated an Inertial Measurement Unit (IMU) 18 and a removable probe 20. The probe 20 is affixed to the bottom end of the housing 16 in any suitable manner such as pin & socket or bayonet mounting for joining and removing the probe as desired.

The metroprobe assembly 10 is relatively small and portable, and the probe 20 may have any suitable configuration and length as desired for extending the reach of the metroprobe 10 in conducting dimensional metrology. The probe 20 has a small spherical tip 22 at the distal, bottom end thereof for use in contacting or touching any of the survey points Pn during the measurement survey.

The dimensional metrology measurement survey is illustrated schematically in FIG. 1 in which the metroprobe 10 is manually transported by metrologist or user conducting the survey to the various survey locations or points Pn in any desired sequence 1, 2, 3, 4, . . . N so that the probe tip 22 may be temporarily placed in contact with the desired survey point Pn for measuring or recording its 3D position or location in space based on a suitable coordinate system and suitable reference location.

The line-of-sight (LOS) of some of the survey points may be blocked by obstructions in or around the object 12, which points are thereby hidden, as shown for the exemplary survey point P4 hidden behind a structural rib of the aircraft. The user may therefore simply carry the metroprobe 10 to each survey point to obtain direct access thereto by the probe tip 22, as long as the slender probe 20 is able to reach the desired survey point, such as the otherwise hidden point P4.

Figure 2:
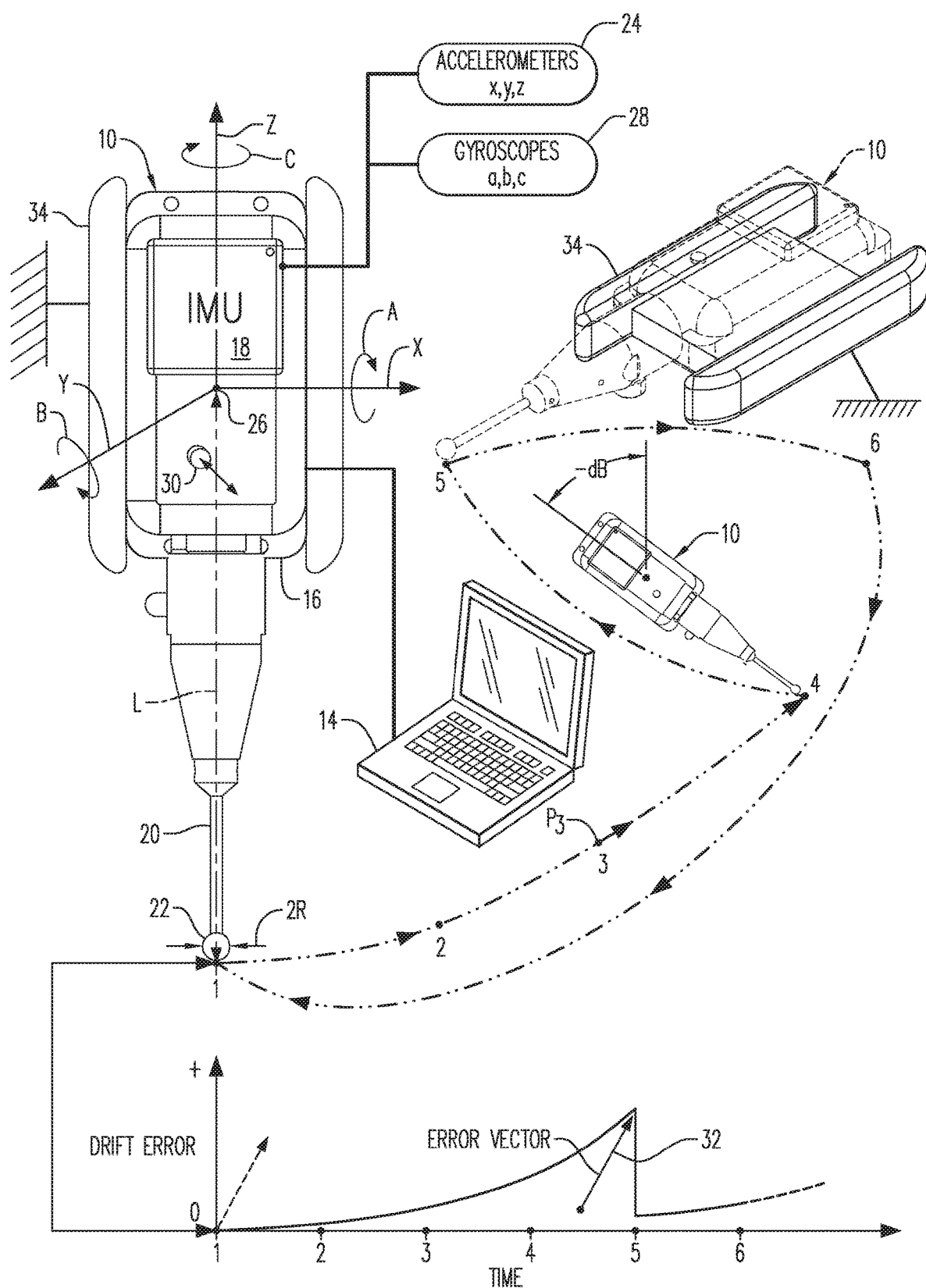
FIG. 2 is a schematic view of the metrology system shown in FIG. 1 for conducting a coordinate measurement survey of a set of points on the object.

The metroprobe 10 is illustrated in more detail in FIG. 2 and may include any suitable commercially available IMU 18 as desired, with corresponding size, performance, and cost, from relatively low to high.

For example, one suitable navigation-grade IMU is commercially available from distributors for Honeywell Aerospace, Phoenix, Ariz., in model HG9900 IMU having correspondingly high performance and cost.

Another suitable example is the industrial-grade VN-100 IMU commercially available from distributors for VectorNav Technologies, Dallas, Tex., which uses Micro ElectroMechanical System (MEMS) sensor technology to integrate various sensors and cooperating IMU processor in a small form factor.

The IMU 18 is shown schematically to include three linear accelerometers 24 arranged orthogonally to each other to correspond with the three orthogonal linear axes X,Y,Z of the conventional Cartesian coordinate system having a common origin 26, which may be the center-of-gravity of the module defining the IMU 18.

The IMU 18 also includes three gyroscopes, or gyros, 28 arranged coaxially with the corresponding accelerometers 24 to correspond with three rotary or angular axes A,B,C of the Cartesian coordinate system, for measuring roll, pitch, and yaw, respectively.

Accordingly, the three accelerometers may be designated 24x, 24y, 24z to correspond with the three linear axes X,Y,Z along which they measure linear or translation movement of the IMU; and the three gyros may be designated 28a, 28b, 28c to correspondingly measure angular or rotary movement of the IMU around the three linear axes X,Y,Z.

The basic IMU 18 may include any other conventional features for operating in a stand-alone module as typically commercially available, including for example its own internal digital processor for controlling operation thereof, and having suitable or standard input and output ports for communicating with an external computer, such as the controller 14.

In the exemplary VectorNav configuration identified above, the IMU may also include 3-axis magnetic sensors, a barometric sensor, and a temperature sensor cooperating with the basic three accelerometers and three gyroscopes, all operatively joined to a 32-bit microprocessor and memory device.

In basic conventional operation, the IMU 18 utilizes the three accelerometers 24 and three gyroscopes 28 to produce a three dimensional measurement of both specific force and angular rate or velocity. Specific force is a measure of acceleration relative to free-fall, and angular rate is a measure of rate of rotation.

Subtracting the gravitational acceleration in the IMU 18 results in a measurement of actual coordinate acceleration. And, by providing the IMU with a reference position, the IMU may thereafter compute its own position and velocity by mathematically integrating the linear accelerations as measured by the three accelerometers 24 suitably corrected using the angular velocities as measured by the three gyroscopes 28 in a conventional manner.

The ability of the IMU to measure and calculate its own position in 3D space is dependent firstly on the inherent accuracy of the accelerometers and gyroscopes themselves, as well as the computational accuracy of the mathematical processing of the data measured thereby. Calculated position accuracy is also dependent on filtering out common error sources, such as sensitivity to supply voltage variations and temperature dependent hysteresis.

A conventional IMU is typically calibrated over a preferred operating temperature range to determine bias, sensitivity, and cross-axis alignment of each individual component; and corresponding calibration coefficients are stored in the IMU for use during operation in filtering out the common error sources. In this way, the basic IMU 18 can measure its own coordinate location or position using the combined outputs from its accelerometers and gyros, with an accuracy and drift error as specified for the particular make and model of the IMU commercially available at a corresponding price.

However, understanding the different components of the inertial IMU and different performance thereof may be used to advantage in specially configuring the inertial metroprobe 10 for enhanced operation and utility in large volume dimensional metrology in contradistinction from the typical use of IMUs for ordinary inertial navigation use.

In navigation, location on the globe is desired, and is typically represented by latitude and longitude in a substantially planar environment represented by the typical surface map of the globe.

In dimensional metrology, 3D locations of the 3D object are being measured, with typically higher precision than needed for common navigation.

And as mentioned above, an understanding of the time-dependent, or temporal, drift errors of IMUs can be used to advantage in performing dimensional metrology.

Drift error is a general term representing the many errors inherent in the typical IMU based in large part on the mathematical double integration required for the three accelerometers to determine linear translation.

An IMU starts operation at an initial location and initial time, and then measures linear acceleration along the three linear axes X,Y,Z and angular velocity along the three rotary axes A,B,C. By mathematically integrating the measured acceleration over time, velocity can be obtained, and by further integrating the velocity, displacement or linear movement or translation along the three linear axes X,Y,Z can also be obtained.

In this manner, the IMU operates by dead reckoning from a known starting location by measuring linear movement therefrom along the three linear axes X,Y,Z to the present location of the IMU. Various drift errors accumulate over time in calculating the location of the IMU as it moves in space, which errors may increase exponentially, or quadratically, over time.

As indicated above, such drift errors can accumulate so that the present location of the IMU may be incorrect after an exemplary hour of travel by 1.6 km to about 7900 km depending on the grade of IMU.

Of course, such position errors would be unacceptable where higher precision is appropriate, and therefore various techniques can be used to reduce or accommodate drift errors in an IMU.

One conventional example for accommodating drift errors in an IMU is the integration therewith of a GPS device to provide an external measurement of position, subject to the inherent positional errors of GPS, at a corresponding increase in complexity and cost.

However, the errors in an IMU are different between the gyroscopes and accelerometers, with gyro errors being substantially less than accelerometer errors due to their different configuration and operation in the IMU. This difference is typically specified as Gyro Bias Error as distinct from Accelerometer Bias Error in specifications presented for commercial IMUs.

Accordingly, the probe 20 illustrated in FIG. 2 is structurally integrated with the IMU 18 in a suitable configuration so that the probe tip 22 can be fixed relative to the IMU 18, and suitably correlated to the origin 26 of the six-axis Cartesian coordinate system X,Y,Z,A,B,C.

For example, the probe 20 has a first offset length L measured from the origin 26 to the bottom of the distal probe tip 22. The tip 22 itself may have a spherical configuration like a typical touch probe, with a suitably small radius R.

The probe 20 is coaxially aligned with the vertical Z-axis of the IMU 18 in the exemplary configuration shown in FIG. 2, or may have any other orientation as desired.

The particular orientation and offset length of the probe 20 is therefore fixed and known relative to the IMU coordinate system so that location and angular orientation or attitude of the IMU correspondingly controls location and attitude of the fixedly attached probe 20.

By correlating position of the probe tip 22 to the origin 26 of the IMU 18, any change in location and angular attitude of the IMU 18 corresponds directly with location and attitude of the affixed probe 20, and its tip 22 in particular.

In this way, a basic method of performing dimensional metrology of the object 12 includes the simple correlation in position of the probe tip 22 having the first offset length L from the origin 26 of IMU coordinate system based on attitude measurement of the IMU itself.

The metroprobe 10 is merely hand-carried or transported by the user during the survey from an initial reference location, such as P1 for example, in a suitable sequence to simply touch or directly contact each of the desired survey points Pn on the object 12 for inertially measuring corresponding coordinates X,Y,Z of the survey points Pn based in part on measured attitude of the affixed IMU 18, which attitude is measured by the gyros 28 of the IMU 18 itself.

A suitable record button 30 is provided in the metroprobe 10 for actuation by the user to record in the controller 14 the specific location and attitude of the metroprobe 10 when the probe tip 22 contacts each desired survey point.

The IMU 18 then measures its own linear travel or translation along the three axes X,Y,Z, to the recorded survey point, which linear travel is identical to the linear travel or translation of the probe 20 and its tip 22.

Quite significantly, the metroprobe 10 can also rotate in 3D spherical space, about the origin 26 for example, to have any orientation or attitude within the full 360 degrees of rotation along the three rotary axes A,B,C.

In FIG. 2, the metroprobe 10 is shown at the left in an exemplary vertical attitude, with the IMU 18 positioned vertically atop the coaxial probe 20 at the bottom end thereof. Full rotary movement of the metroprobe 10 allows infinite attitudes in space from IMU-side up, or upside-down with the probe 20 up and the IMU 18 down, or at any attitude therebetween. The metroprobe 10 is therefore operable without attitude limitation, including full attitude motion from horizontal to vertical, and all inclination attitudes therebetween.

The three gyros 28 accurately measure angular rate of rotation or velocity, which may be mathematically integrated in the IMU processor to accurately calculate, or measure, angular orientation or attitude of the IMU 18, with the attached probe 20 experiencing the same angular movement and attitude.

Accordingly, the position of the probe tip 22 may be mathematically established by combining the linear translation and angular attitude of the probe 20 as it travels with the metroprobe 10 in any suitable orientation for accessing any survey point, including otherwise hidden survey points.

Simple trigonometry is used to resolve the three components of the offset length L of the probe 20 along the three linear axes X,Y,Z which are then added to the measured coordinates X,Y,Z of the IMU 18 at its origin 26 to correspondingly establish the linear position and coordinates X,Y,Z of the probe tip 22 itself.

For example, the linear coordinates of the probe tip 22 may be expressed as P22(XYZ)=P26(XYZ)+V22(XYZ); where V22 represents the coordinate vector from the origin 26 to the probe tip 22.

The tip vector V22 can be resolved by trigonometry for obtaining the respective components of the probe length L from the origin 26 as represented by L(XYZ) which is a function of the attitude A,B,C of the probe 20.

In the special configuration of the coaxially aligned IMU 18 and probe 20, changes in attitude in the yaw C-axis do not affect the coordinates of the probe tip 22 and simplifies the trigonometry.

For the exemplary vertical attitude A,B,C=(0,0,0) of the metroprobe 10 shown at the left in FIG. 2, the coordinates P22(XYZ) of the probe tip 22 are simply the measured coordinates P26 of the IMU origin 26 minus the offset length L, or P22(XYZ)=(X,Y,Z−L), which represents the linear coordinates of measured first survey point P1.

In another exemplary vertical attitude of the metroprobe 10 shown at survey point P4, the metroprobe 10 has an attitude inclination angle dB, which is the differential or delta angle in the −B pitch direction only, i.e. (A,B,C)=(0, −dB, 0). The −dB attitude angle inclines the probe 20 counterclockwise solely in the X-Z plane, and correlates with the coordinate position of the probe tip P22(XYZ)= (X+L×Sine(dB), Y, Z−L×Cosine(dB)) relative to the new P26(XYZ) coordinate position of the IMU origin 26 from which the probe contacts the fourth survey point P4 whose measured coordinates equal the new P22(XYZ) coordinates.

The vector V22 may be similarly resolved in the YZ plane, or in any attitude corresponding with the changing attitude of the metroprobe 10 during operation.

Since the metroprobe 10 can be hand-held and properly operate at any angular attitude, it is not constrained in use and may be freely moved to access any survey point without regard to LOS obstructions as long as suitable access is provided to the probe 20 itself.

Accordingly, the probe 20 can be removable and replaced with various custom configurations for accessing any desired survey points requiring short or long lengths, or straight or curved paths, with the probe tip 22 nevertheless being simply correlated to the IMU origin 26 for establishing its linear X,Y,Z coordinate position relative thereto.

Because the IMU 18 includes the three accelerometers 24 and three gyros 28 for correspondingly defining the three orthogonal linear axes X,Y,Z and three respective angular axes A,B,C, the linear coordinate position X,Y,Z of the probe tip 22 can be readily correlated to the Cartesian X,Y,Z coordinate system and its origin 26 based on the angular attitude A,B,C of the IMU 18 as measured by its own gyros 28.

And, as indicated above, gyro bias errors are substantially small in conventional IMUs, and much smaller than accelerometer bias errors, and therefore allow increased accuracy in measuring coordinate position of the probe tip 22 in the specially configured metroprobe 10.

Figure 3:
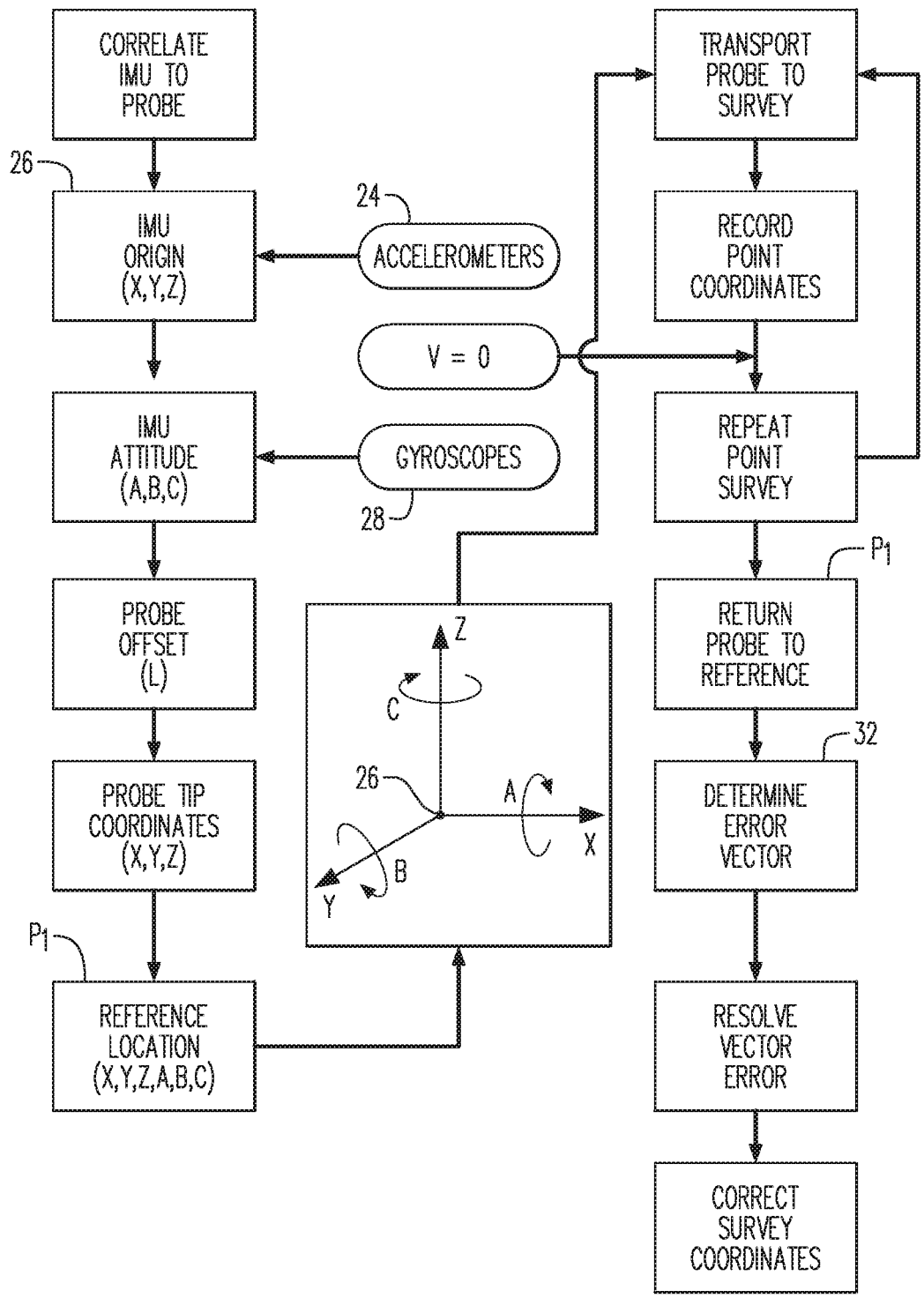
FIG. 3 is a flowchart for performing the metrology survey of FIGS. 1 and 2.

FIG. 3 shows a flowchart depiction of the basic method of performing large volume dimensional metrology using the dedicated inertial metroprobe 10 in a relatively simple configuration integrating the conventional IMU 18 with the suitable probe 20 and controlled by a suitable controller 14 in the simple form of the typical laptop computer configured with suitable control and measurement software.

Since the typical IMU measures relative movement of the IMU itself, the measurement survey preferably begins by initially transporting the metroprobe 10 to any suitable reference location to establish at the probe tip 22 three linear reference coordinates relative to the three linear axes X,Y,Z and three angular reference coordinates relative to the three angular axes A,B,C, all based on the reference origin 26 in the six-axis Cartesian reference coordinate system.

For example, the first survey point P1 itself may be used as the first reference location to establish nominal X,Y,Z reference coordinates such as (0,0,0) for the IMU or coordinate system origin 26, or for the probe tip 22 itself as desired. This may also establish the nominal A,B,C reference coordinates such as (0,0,0) for the attitude of the IMU 18 or probe 20 as well.

Accordingly, as the metroprobe 10 is hand-carried in series to the remaining survey points Pn, the respective linear X,Y,Z coordinates thereof may be measured by the metroprobe 10 relative to the (0,0,0) reference coordinates of the reference location of the metroprobe 10.

With the linear coordinate position X,Y,Z of the probe tip 22 correlated to the attitude of the IMU 18 as described above, transport of the metroprobe and re-orientation thereof to reach subsequent survey points will readily establish and record corresponding or correlated linear coordinates X,Y,Z at each survey point Pn upon simply depressing the record button 30 on the metroprobe 10.

Since the probe tip 22 may have any suitable offset position in 3D space, its position is preferably correlated to the coordinate system origin 26 based on corresponding angular position or attitude of the probe 20 relative to the three linear axes X,Y,Z. The probe tip 22 may be offset based on any one, or more, of the three axes X or Y or Z, but in all cases simply trigonometry can correlate the linear coordinates of the tip 22 in the IMU coordinate system.

In the simple configuration shown in FIG. 2, the probe 20 is coaxially aligned solely with the Z-axis in the X-Z plane, and its tip 22 has a single offset from the origin 26 measuring L in length, without any offset of the tip along the X & Y axes.

In the exemplary method illustrated in FIGS. 1-3, the metroprobe 10, alone, is transported by the user in a sequential survey of the multiple survey points Pn, at which the linear positions X,Y,Z of the IMU 18 are measured and recorded by depressing the record button 30.

Simultaneously, attitude of the IMU 18 in the angular axes A,B,C is also recorded and used to correlate therewith the corresponding attitude of the probe 20.

This survey is recorded and controlled by the laptop computer 14 which is used to establish or calculate the corresponding linear coordinates X,Y,Z of the probe tip 22 in contact with the survey points Pn as correlated with the measured linear positions X,Y,Z of the IMU 18.

Since the IMU 18 includes the accelerometers and gyroscopes which define the corresponding three orthogonal linear axes and three respective angular axes, the angular attitude A,B,C of the IMU 18 in three axes is measured by the gyros 28 in the IMU 18, and the linear positions X,Y,Z of the IMU 18 in three axes are measured by both the three accelerometers 24 and three gyroscopes 28 in a conventional manner.

In a preferred and basic embodiment, the metroprobe 10 is autonomous in performing the dimensional metrology of the object 12, and is operatively joined to the controller 14 for establishing the linear coordinates X,Y,Z of the probe tip 22 at the many survey points Pn relative to the three orthogonal linear axes X,Y,Z based on the measured three-axis linear position X,Y,Z and three-axis attitude A,B,C of the IMU 18.

Precision or accuracy of the measured coordinate locations X,Y,Z for each of the full complement of survey points Pn is therefore based solely on the inherent accuracy of the conventional IMU used in the metroprobe 10, based in part on the bias errors of the accelerators and based in additional part on the bias errors in the gyros.

However, as indicated above, the gyro bias errors are substantially smaller than the accelerometer bias errors which improves the overall precision and accuracy of the metroprobe 10 in its special configuration for conducting large volume dimensional metrology in the exemplary method disclosed above.

Since the IMU 18 is subject to temporal drift errors, the linear coordinates X,Y,Z at the survey points Pn can be suitably corrected to reduce the drift errors.

For example, the method may be modified to include transporting the metroprobe 10 between two suitable reference locations in surveying the survey points Pn, and establishing a position error vector 32 as shown in FIG. 2 based on a difference in linear positions X,Y,Z measured at the two reference locations, and then mathematically resolving the error vector to reduce corresponding errors in the linear coordinates X,Y,Z at the applicable survey points Pn.

FIG. 2 illustrates schematically how the IMU drift error increases with time during transportation of the metroprobe 10 during the measurement survey. Since the survey can take minutes to hours to complete depending on the particular survey, the accumulation of drift error can be small or large, especially since the accelerometer drift error can increase exponentially with time.

In FIG. 2, the drift error increases in time for each of the three accelerometers 24, and collectively result in the total drift error vector 32 which has increased size at subsequent survey points.

The total error in the linear coordinates X,Y,Z can be represented by the single error vector 32 at any suitable survey point and can be mathematically resolved into constituent components in the three linear axes X,Y,Z, but then requires suitable distribution or attribution to all previous survey points from which it was made.

Since the drift error is known to accumulate exponentially according to IMU performance, knowledge of that IMU performance can be suitably used to correspondingly reduce more error in the linear coordinates at subsequent survey points.

In other words, the drift error accumulates according to known performance of the IMU, and therefore can be resolved and distributed in reverse sequence over the relevant time period.

Since the first survey point, P1 for example, initiates the process at the reference coordinates (0,0,0) it establishes a reference zero drift error condition.

If the metroprobe 10 is periodically returned to the first survey point P1 it will effect a total error vector 32, like that shown for the fifth survey point P5 in FIG. 2 where P5 may also represent return to the first survey point P1.

By resolving the total error vector 32 based on the duration of the survey, and based on actual time intervals measured between the sequential survey points, corresponding error corrections can be made at each of the intervening survey points between the first point P1, and the return thereto.

A similar correction in drift error can be performed by establishing the total drift error vector from the initial reference location P1 and any subsequent reference location, such as fifth point P5, which can have a separately determined known position, just as the first reference location P1 is assumed to have the known (0,0,0) reference coordinates.

By understanding and knowing the form of the specific drift error over time, various corrections therefor may be mathematically effected in suitable software in the laptop computer 14 to suitably correct the measured survey coordinates X,Y,Z at each of the survey points during which the drift error is experienced.

Another method for correcting drift error of IMUs includes suitably introducing a zero velocity (V=0) update in the integration of acceleration as conventionally known. Since a significant component of drift error is attributed to the double integration of acceleration to obtain displacement in the IMU, periodically introducing the zero velocity update restarts a portion of the integration process which establishes displacement along the three linear coordinates X,Y,Z.

Although, the concept of zero velocity update is conventionally known, there are different methods of introducing such update, yet again having different advantages and problems.

In view of the special hand-held configuration of the metroprobe 10 illustrated in FIGS. 1 and 2, it may be periodically placed in a stationary cradle 34 at one or more of the survey points Pn, upon which a zero velocity (V=0) may then be introduced to update the IMU 18 and reduce the drift errors in all three linear coordinates for subsequent survey points.

Since the metroprobe 10 is typically hand-held during the survey process, it is difficult to actually hold still to establish in reality zero velocity thereof.

The cradle 34 can be specifically configured to provide a complementary seat or socket for temporarily rigidly locking therein the metroprobe 10 to ensure that introduction of the zero velocity update into the processor controlling IMU operation occurs in fact when the metroprobe 10, and integrated IMU 18, are in fact stationary with zero movement or velocity.

In FIGS. 1 and 2, the cradle 34 can be temporarily affixed or hot-glued at any suitable location for conducting the survey and/or introducing the zero velocity update.

For example, FIG. 2 illustrates schematically that the cradle 34 can be affixed in the object 12 initially at the first survey point P1 to ensure an accurate initial calibration of the IMU 18 for the reference or starting coordinates X,Y,Z, at which the IMU 18 will have no movement or motion, and therefore should record an accurate reference coordinate location.

FIG. 2 also illustrates that another cradle 34 can be affixed to the object 12 at the exemplary fifth survey point P5, at which the metroprobe 10 will again be held stationary with no movement or motion, or velocity, and therefore the zero velocity (V=0) update can be accurately introduced in the IMU processor so that drift errors will be temporarily reduced, after which the drift errors will again (re)accumulate as the survey continues.

During the measurement survey, the metroprobe 10 is transported in turn to each of the survey points Pn at which the record button 30 is depressed for recording in the laptop computer 14 the six IMU coordinates X,Y,Z,A,B,C for each of the survey points. This survey process is repeated for each survey point, and depending on the duration of the survey, and the need for zero velocity update, such update may be introduced as desired or required.

And, if desired, the cradles 34 may be temporarily affixed or hot-glued at each of the intended survey points Pn for temporarily affixing thereat the portable metroprobe 10 to ensure no movement thereof when the coordinate measurements are being made.

Alternatively, the user may be instructed to manually hold still the metroprobe 10, without using the cradle, at various survey points Pn within the physical ability to do so to minimize movement of the metroprobe 10 when the record button 30 is depressed to maximize accuracy of the recorded position Pn.

At the end of the survey, or at convenient intervals therein, the metroprobe 10 may be returned to the original reference point, P1 for example, for subsequently establishing a total or interim error vector, which may then be resolved as disclosed above for suitably correcting the measured survey coordinates X,Y,Z for the respective survey points Pn.

Error correction and introduction of zero velocity updates can be applied either singly or in combination as desired for any particular measurement survey; and may also be applied at suitable intervals in performing the survey depending upon the expected duration of the survey.

Figure 4:
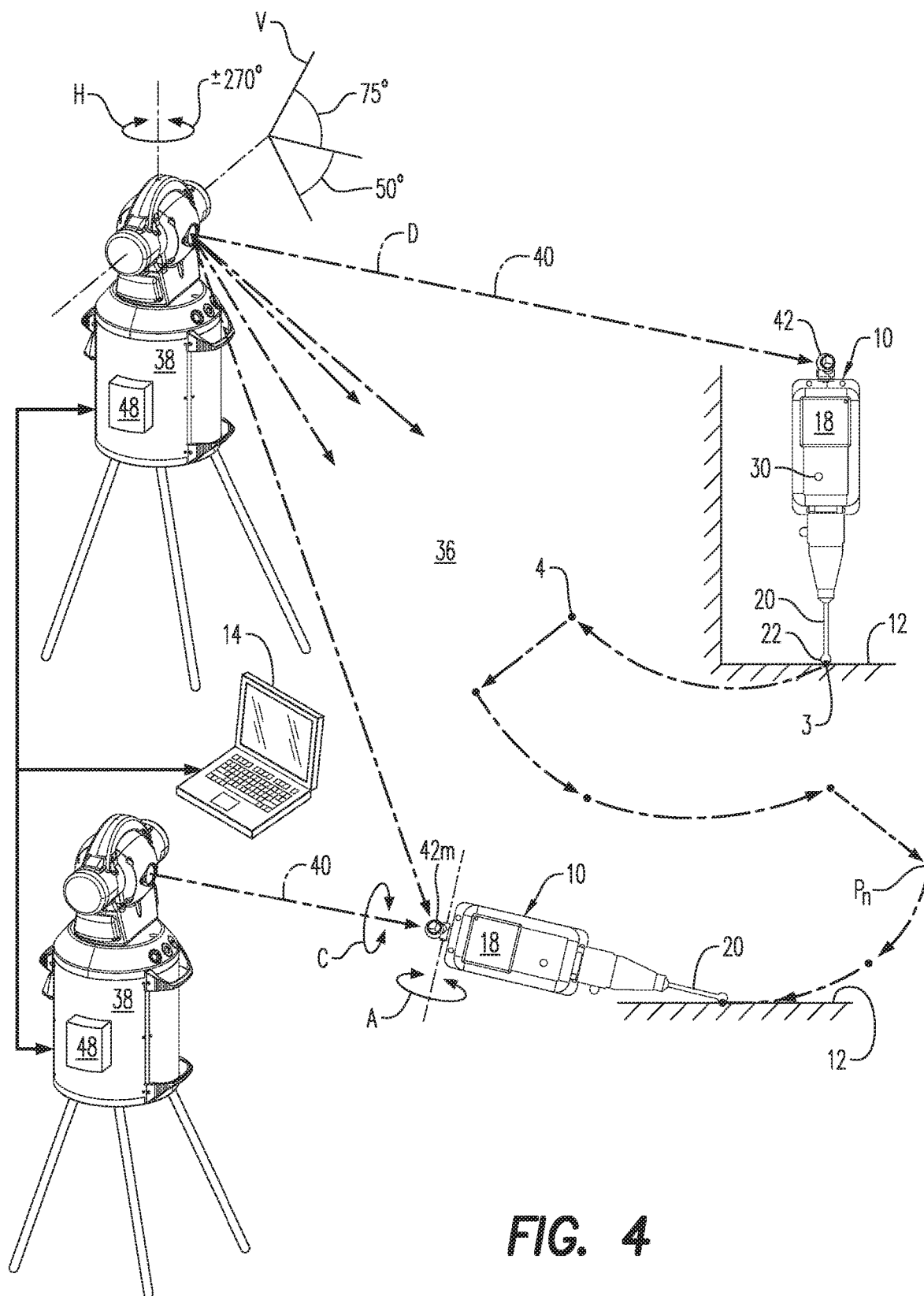
FIG. 4 is an elevational isometric view of a modified metrology system additionally including a laser tracker cooperating with the metroprobe shown in FIGS. 1 and 2 for conducting the measurement survey of the object shown in FIG. 1.

However, measurement precision in the metrology survey can be further improved by using a modified metroprobe system 36 for performing large volume dimensional metrology of the object 12 as initially shown in FIG. 4.

The metroprobe system 36 includes a suitable coordinate measurement machine (CMM) in the exemplary form of a conventional laser tracker 38 having a variable horizontal (H) and vertical (V) field of view through which a laser beam 40 is aimed or directed toward the various survey points Pn for accurately measuring the distance D thereto.

For example, one suitable laser tracker 38 is the FARO Laser Tracker ION(™) commercially available from distributors for FARO Technologies Inc, Lake Mary, Fla., and has a horizontal field of view of +/−270°; and a vertical field of view of +75° and −50°, with an exemplary accuracy or precision of about 15 microns (0.0006 inches) at 18 meters.

Another example of the laser tracker 38 is the Leica Absolute Tracker AT402 commercially available from distributors for Leica Geosystems, Norcross, Ga., and has a horizontal field of view of +/−360°; and a vertical field of view of +/−145°, with an exemplary accuracy or precision of about 15 microns (0.0006 inches) per meter for the measured distance.

Laser trackers typically operate with a cooperating reflective target in the exemplary form of a Spherically Mounted Retro-reflector (SMR).

Accordingly, the portable metroprobe 10 illustrated in FIG. 4 is preferably modified so that the inertial measurement unit (IMU) 18 is integrated with both the elongate probe 20 as previously described, and a spherically mounted retro-reflector (SMR) target 42 specifically configured to reflect back to the laser tracker 38 the laser beam 40 for accurately measuring the distance D therebetween.

The SMR target 42 may have any conventional configuration, and is typically commercially available in paired or matched configuration with the specific laser tracker, such as the FARO or Leica examples presented above, for maximizing accuracy of measurement. Fundamentally, the SMR target includes a precision reflector for reflecting back the laser beam to the laser tracker for precisely measuring the distance therebetween.

The SMR reflector is typically configured as a corner cube having three orthogonal mirrors joined together at a common target corner from which the laser beam 40 is reflected back to the laser tracker 38 for measuring the distance D thereto.

The spherical coordinates H,V for the laser beam 40 and the measured distance D to the matched target 42 may then be resolved or converted to corresponding linear coordinates X,Y,Z to define the 3D position or location of the target 42 based on a suitable reference location.

The laptop controller 14 is operatively joined to both the laser tracker 38 and the IMU 18 for controlling operation thereof.

Figure 5:
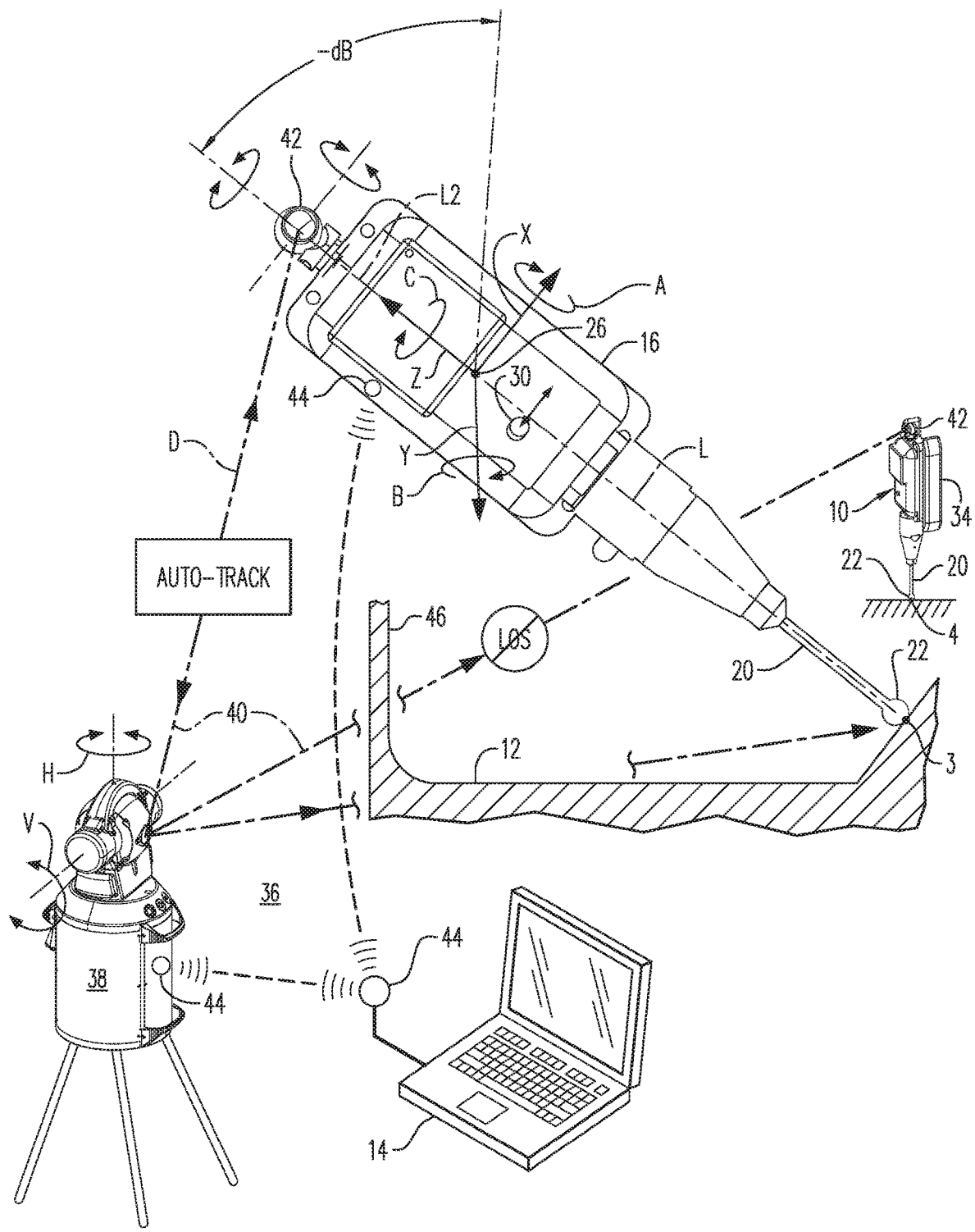
FIG. 5 is a schematic view of the modified metrology system shown in FIG. 4 for conducting the measurement survey of the set of points.

As shown in FIG. 4, any suitable communication between the controller 14 and the laser tracker 38 and IMU 18 may be used, such as a wired tether, or wireless communication using standard WLAN adapters 44 integrated therewith using standard input/output ports as shown schematically in FIG. 5.

The laptop controller 14 is suitably configured in software to control operation of the laser tracker 38 and IMU 18 in conducting the measurement survey, and in particular is used to correlate position and attitude of both the probe 20 and the target 42 to the reference X,Y,Z,A,B,C Cartesian coordinate system in the IMU 18.

The laser tracker 38 is configured in conjunction with the metroprobe 10 for establishing position coordinates for the probe 20 at the plurality of survey locations or points Pn on the object 12 based on coordinate location X,Y,Z of the target 42 as measured by the laser tracker 38 and based also on attitude A,B,C of the IMU 18 as measured by the IMU 18.

A modified method of performing large volume dimensional metrology on the object 12 may therefore include measuring linear positions X,Y,Z of the IMU 18 by the independent coordinate measurement machine (CMM) having direct line-of-sight (LOS) with the metroprobe 10; and then establishing the linear coordinates X,Y,Z of the probe tip 22 at the corresponding survey points Pn as correlated to the linear positions X,Y,Z of the IMU 18 as measured by the CMM.

In a preferred configuration, the CMM comprises the laser tracker 38 having the variable horizontal (H) and vertical (V) field of view, and the cooperating target 42 is integrated with both the IMU 18 and the probe 20 in the common metroprobe 10.

As shown in FIG. 5, the target 42 has a second offset length L2 as measured between its reflective target corner and the origin 26 of the common X,Y,Z,A,B,C Cartesian coordinate system in the IMU 18. The position of the target 42 at its target corner, as measured by the laser tracker 38, is similarly correlated to the coordinate system origin 26 in the IMU 18 based on the A,B,C attitude measurement of the IMU 18 for correspondingly establishing the linear position X,Y,Z of the IMU 18, and in turn establishing the linear coordinates X,Y,Z of the probe tip 22 at the various survey points Pn.

The IMU 18 provides a common reference for correlating movement of both the probe tip 22, as described above, and the attached target 42 during operation based on the measured attitude A,B,C of the IMU 18.

In the autonomous embodiment of the metroprobe 10 described above, the position of the probe tip 22 is correlated to the position of the common origin 26 as measured by the IMU 18.

In the SMR target 42 modification of the metroprobe 10, the more accurate location of the target 42 as measured by the laser tracker 38 is substituted for the less accurate location of the IMU origin 26 as measured by the IMU itself, and a similar correlation is used between the target 42 and the probe tip 22 but still based on the common origin 26 of the integrated IMU.

In the exemplary configuration illustrated in FIG. 5, the probe 20 and IMU 18 are coaxially aligned with the common Z-axis in the same configuration illustrated in FIG. 2, but the SMR target 42 is further introduced in a special configuration additionally coaxially aligned with the common Z-axis. In this special configuration, the measured corner reflector of the target 42 and origin 26 of the IMU 18 and the probe tip 22 are all coaxially aligned in a straight line having a total length of L+L2.

In this modified correlation, the linear coordinates of the probe tip 22 may be generally expressed as P22(XYZ)=P42(XYZ)+V26(XYZ)+V22(XYZ); where P42(XYZ) represents the measured coordinates of the target 42, V26(XYZ) represents the coordinate vector from the measured target 42 to the IMU origin 26, and V22(XYZ) again represents the coordinate vector from the origin 26 to the probe tip 22.

The tip vector V22 is the same as that described above.

The origin vector V26 can be similarly resolved by trigonometry for obtaining the respective components of the target offset length L2 from the measured target 42 as represented by L2(XYZ) which is yet again the same function of attitude A,B,C of the IMU 18 and probe 20.

In the special configuration of the coaxially aligned target 42, IMU 18, and probe 20, changes in attitude in the yaw C-axis do not affect the coordinates of the probe tip 22 and simplifies the trigonometry.

For the exemplary vertical attitude A,B,C=(0,0,0) of the metroprobe 10 shown at survey point P4 to the right in FIG. 5, the coordinates P22(XYZ) of the probe tip 22 are simply the measured coordinates P42(XYZ) of the target 42 minus the total offset lengths L2+L, or P22(XYZ)=(X,Y,Z−(L2+L)), which represents the linear coordinates of measured survey point P4.

In another exemplary vertical attitude of the metroprobe 10 shown at survey point P3 in FIG. 5, the metroprobe 10 again has an attitude inclination angle dB in the −B pitch direction only, i.e. (A,B,C)=(0, −dB, 0), which again inclines counterclockwise the metroprobe 10 solely in the X-Z plane, and correlates with the new coordinate position of the probe tip P22(XYZ)=(X+(L2+L)×Sine(dB), Y, Z−(L2+L)×Cosine (dB)) relative to the new P42(XYZ) coordinate position of the target 42 as measured by the laser tracker 38. The probe tip 22 contacts the third survey point P3 whose coordinate position therefore matches the so calculated new tip coordinates P22(XYZ).

The vectors V26 and V22 may be similarly resolved in the YZ plane for any roll inclination angle dA in the roll rotary axis-A, or in any attitude corresponding with the changing attitude of the metroprobe 10 during operation.

In other configurations of the metroprobe 10 in which the target 42, IMU 18, and probe tip 22 are not coaxially aligned, corresponding vectors V26 and V22 still define the corresponding offset length L2 between the target 42 and origin 26, and offset length L between the origin 26 and probe tip 22, and similar vector analysis may be used to correlate coordinate location P22(XYZ) of the probe tip 22 to the origin coordinates P26(XYZ) and target coordinates P42(XYZ).

Accordingly, the linear X,Y,Z coordinate position of the probe tip 22 may be mathematically correlated and established by combining the linear translation of the metroprobe 10 as measured at the target 42 with the angular attitude of the metroprobe 10 as measured by the IMU 18 in any suitable orientation or attitude for accessing any survey point, including otherwise hidden survey points.

As described above, the target 42 preferably comprises the spherically mounted retro-reflector (SMR), which is suitably affixed or mounted atop the housing 16 containing the IMU 18 in the metroprobe 10. Other than the addition of the SMR target 42, the metroprobe 10 is identical in configuration and function to the one described above, including the use of the three accelerometers 24 and three gyroscopes 28 for correspondingly defining the same three orthogonal linear axes X,Y,Z and the same three respective angular axes A,B,C.

Figure 6:
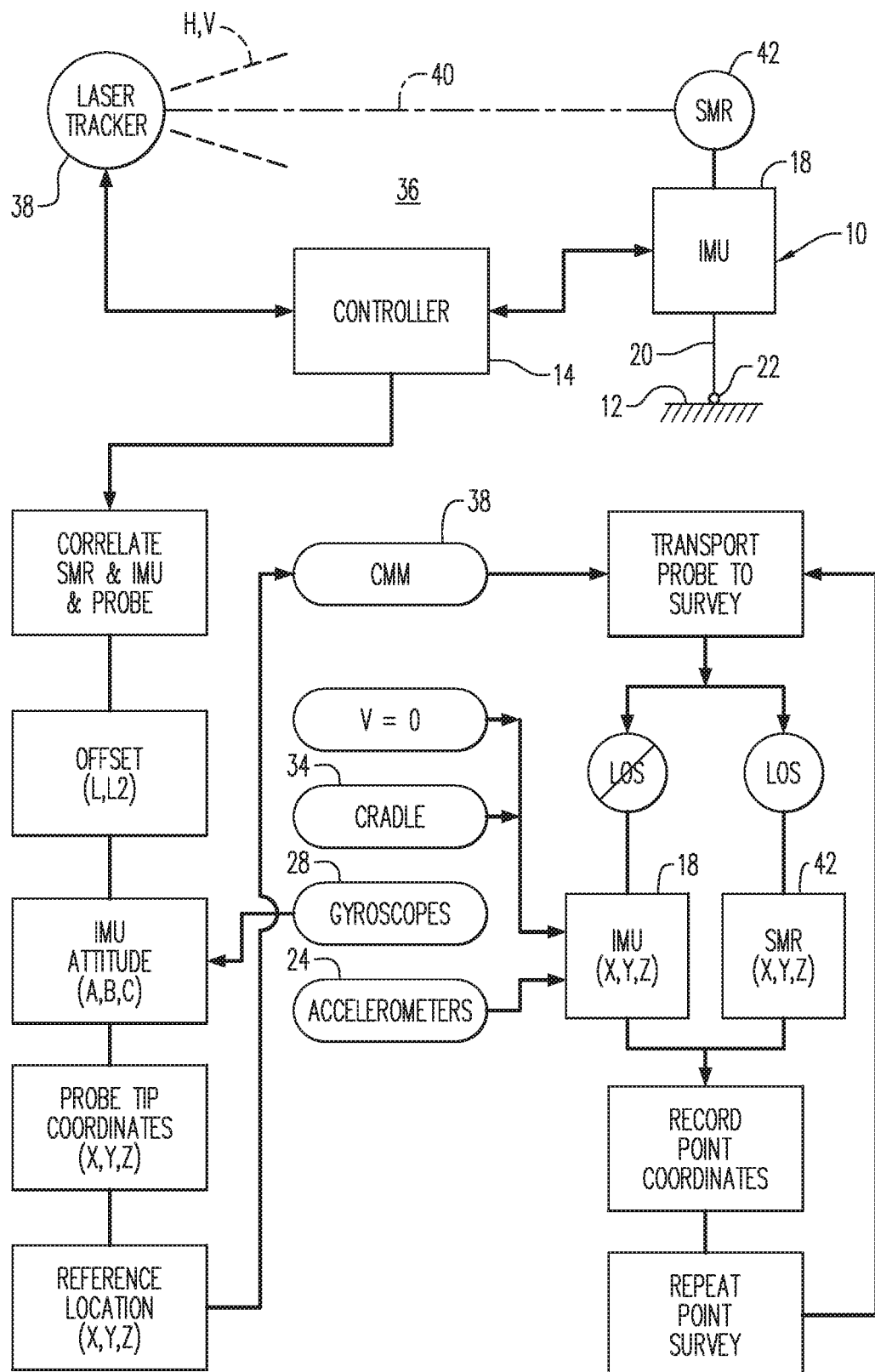
FIG. 6 is a flowchart for performing the metrology survey of FIGS. 4 and 5.

In the basic measurement survey illustrated in FIG. 6, the laser tracker 38 is used to precisely measure linear position of the target 42 by directing the laser beam 40 directly along the line-of-sight (LOS) therewith to in turn establish the linear coordinates of the probe tip 22 as correlated with the target 42 through the IMU 18 as presented above.

By also measuring attitude (A,B,C) of the IMU 18 using the three gyroscopes 28 therein, suitable correlation with attitude of both the probe 20 and the target 42 having the corresponding offset lengths L,L2 may then be used to correlate the linear position of the probe tip P22(XYZ) to the coordinate system origin 26 in the IMU 18 as also described above.

However, when line-of-sight (LOS) to the target 42 is blocked by some obstruction 46, such as a portion of the survey object 12 itself, the linear position of the IMU 18 is instead measured using the three accelerometers 24 therein to in turn establish the linear coordinates of the probe tip P22(XYZ) as correlated with the IMU 18 in the manner described above.

The survey process may be further modified by placing the metroprobe 10 in a stationary cradle 34 at one of the survey points, like point P4 shown in FIG. 5, when line-of-sight (LOS) to the target 42 is blocked by the obstruction 46.

By using the cradle 34 to temporarily immobilize the metroprobe 10 during the survey, the zero velocity update (V=0) may be introduced in the IMU 18 in the same manner described above to reduce drift errors in all three linear coordinates (X,Y,Z) in sequential or subsequent survey points in which line-of-sight (LOS) to the target 42 may also be blocked.

IMU performance can be improved by updating it with known position information whenever possible. Since the precise location of the SMR target 42 as measured by the laser tracker 38 is continually updated during the survey, the correlated and equally precise location of the IMU 18 may also be continually updated by the controller 14.

The introduction of the zero velocity update in the IMU 18 is appropriate whenever the IMU 18 is known to be stationary since the drift errors continuously accumulate, and the update may be introduced manually through the controller 14 or manually upon depressing the record button 30 when the IMU 18 is mounted in the stationary cradle 34.

The zero velocity update may even be introduced by programming the controller 14 to detect and recognize in the IMU 18 either measured acceleration or velocity below a defined low-value threshold, which threshold could be a function of the error-time performance as specified for a particular IMU.

A particular advantage of the metroprobe 10 is its configuration and total length L2+L as measured from target-to-tip to improve access to various survey points Pn, especially those points partially or fully hidden by various obstructions from the field of view of the laser tracker 38.

Most of the metroprobe 10 can be hidden from LOS access, as long as the target 42 remains visible within the LOS of the laser tracker 38, and a precise measurement of the hidden survey point, such as point P3, may still be made. The precision or accuracy of the measured coordinates at the probe tip P22(XYZ) will closely match the specified precision of the laser tracker 38 itself due to the low bias error and high precision operation of the gyroscopes 28 in the IMU 18 which are used to correlate position of the probe tip 22 to the position of the target 42 being measured.

When the target 42 itself is hidden from the laser tracker 38, the coordinate position P26(XYZ) of the IMU origin 26 is instead measured using the IMU 18 itself and correlated to the coordinate position of the probe tip 22, having a measurement accuracy dependent on accuracy of the IMU 18, including the substantial accuracy component due to the low gyro bias errors inherent therein.

Additional advantages may accrue to the combined use of the laser tracker 38, IMU 18, and controller 14 as specifically configured for controlling operation thereof.

As described above, linear position P26(XYZ) of the IMU 18 at its origin 26 may be measured by the IMU using its accelerometers 24, and similarly reverse-correlated to the position P42(XYZ) of the SMR target 42 so that measured location of the IMU 18 may be specially used to determine coordinate location P42(XYZ) of the target, independent of the location of the target as measured by the laser tracker 38.

In this way, the laser tracker 38 may itself be feedback-controlled to follow or track movement of the target 42 atop the metroprobe 10 based on the linear coordinate position P26(XYZ) of the IMU 18 as measured by the IMU itself.

The IMU 18 provides a new ability for obtaining automatic tracking (Auto-Tracking) between the laser tracker 38 and its SMR target 42 within the specified field-of-view of the laser tracker. And, this automatic tracking may be accomplished using any conventional SMR target in its simplest and most inexpensive fixed form.

However, further improvements may be obtained by using a target 42*m* as illustrated in FIG. 4 in the special configuration of a multiaxis motorized SMR pivotally mounted atop the IMU 18 in the metroprobe 10.

Any conventional motorized SMR may be used, such as the Active Target(™) commercially available through distributors for Automated Precision Inc, Rockville, Md. The SMR Active Target 42*m* has an azimuthal tracking angle corresponding with the yaw C-axis of unlimited 360°, and an elevational tracking angle corresponding with the pitch A-axis of +80° and −55°. The SMR may therefore be actively directed within its field of view toward the laser tracker source of the laser beam incident to the motorized SMR.

The laser tracker 38, the motorized SMR target 42*m*, and the IMU 18 are all operatively joined to the common controller 14 which is suitably configured in software for automatically guiding or tracking the laser tracker 18 to actively follow movement of the motorized SMR target 42*m*, and also automatically back-tracking the motorized SMR target 42*m* to actively follow heading or direction movement of the laser tracker 38 in response to IMU-correlated position of the SMR target 42 relative to position and attitude of the IMU 18.

Automatic tracking between a laser tracker and its SMR target is a common feature that ensures that the laser beam of the tracker is continuously aimed at the target as the target itself moves during a measurement survey.

Using a non-motorized target, the laser tracker itself must be suitably motorized and controlled to aim its laser beam toward the moving target.

Using a motorized target, both motorized target and laser tracker can improve automatic tracking therebetween, but such operation still requires LOS visibility therebetween.

By further introducing the IMU 18 in the metroprobe 10, further improvement and tracking accuracy may be additionally obtained by communicating aiming directions to the laser tracker 38 to follow movement of the motorized target 42*m* based on its location as measured by the IMU 18.

In this configuration, LOS visibility between the laser tracker 38 and SMR target 42*m* can be temporarily lost or broken by various obstructions during the survey, but the laser tracker 38 can nevertheless still be controlled to still follow the temporarily hidden SMR target 42*m*.

By maintaining continuous and accurate tracking of the laser beam 40 emitted from the laser tracker 38 and either its non-motorized SMR target 42 or motorized SMR target 42*m*, the measurement survey can be completed more accurately and with minimal, if any, interruptions, and thereby enhance the advantages associated with active tracking of the SMR target.

Further improvements in the large volume dimensional metrology survey may also be obtained by optionally integrating a second IMU 48 with the laser tracker 38 itself as shown in FIG. 4. The second IMU 48 may have any conventional configuration, such as the exemplary configurations described above for the first IMU 18 integrated in the metroprobe 10.

The second IMU 48 is fixedly attached to the laser tracker 38 and again suitably operatively joined to the common laptop computer controller 14 for measuring linear position (XYZ) and attitude (ABC) of the second IMU 48.

The measurement survey may then be conducted using the IMU-embedded laser tracker 38 at two different reference locations having line-of-sight with a plurality of common survey points for measuring coordinates thereof.

The least squares iterative optimization process introduced above in the Background section may then be conducted using the position and attitude of the second IMU 48 at the two different reference locations and the measured coordinates at the common survey points to conform all measurements from the laser tracker to a common coordinate reference system.

The mathematical least squares process may be used whenever appropriate to improve CMM measurement accuracy and confidence anytime multiple CMM observations occur on a measurement or common tie-in point to re-establish a common coordinate reference system.

The mathematical optimization process to tie-in all the measurements from all the different CMM locations is generally referred to in academia as a least squares problem. There are numerous variations of the tie-in process. However, least squares is the underlying mathematical principal.

When least squares is used in the metrology process, each measurement point can be treated as three variables. For example, the Cartesian location X, Y, and Z. Also, each CMM can be treated as six variables. For example, the Cartesian position of the CMM X, Y, and Z and its three orientation angles pitch (A), roll (B), and yaw (C).

The actual measurement data from each CMM to each point can be treated as up to three observations. In the case of the CMM laser tracker, the observations can be laser range, horizontal laser pointer angle, and vertical laser pointer angle.

After initial estimates of the CMM X,Y,Z position and A,B,C orientation are created, all the variables and observations for each measurement are written out in a system of equations and solved simultaneously in a least squares fashion. The least squares solution produces adjustments to the three measurement point variables and six CMM variables.

The adjustments should result in a better least squares fit for each of the measurement observations. The measurement observations are considered constants in the system of equations. After applying the adjustments to the variables, a new system of simultaneous equations is constructed and solved for another set of adjustments for the same variables.

The iterative process is repeated until the adjustments to the variables are insignificant and the optimum measurement point locations and CMM positions and orientations are obtained in a common reference system tying together all measurement points and the two or more CMM viewing locations.

This mathematical least squares process is merely a general description. Variations of the least squares process can be effectively applied to accommodate for scale adjustments, constraints on various measurements, confidence weighting on various measurements, and many other issues in accordance with conventional practice.

The first step in the mathematical optimization process provides an initial estimate of the position and orientation of the CMM at its different locations in the measurement survey. Conventionally, this initial estimate is arbitrary, and may be randomly selected.

By embedding the second IMU 48 in the CMM and aligning it with a common position and orientation, the second IMU 48 can provide a generally accurate position and orientation for the CMM at the different locations for the initial step of the mathematical optimization process for improving that process.

Aligning the second IMU 48 in the CMM to a common position and orientation can be effected for one or more CMMs used in the measurement survey. When a single CMM is being used for the metrology survey, position and orientation of the single CMM on the first measurement or tie-in point observation may be used as the reference. When the CMM is moved for observations on a different measurement or tie-in point, the second IMU 48 embedded in the CMM can report its new position and orientation parameters for utilization in the least squares process.

For the case of multiple CMMs, the mathematical least squares optimization process may begin with simple least squares estimates of the CMM position and orientation. However, after observations for each CMM on common points are taken, the complete least squares process can be used to update the position and orientation of the second IMU 48 in each CMM for subsequent measurements.

The IMU updating procedure just described could precede the metrology survey as a calibration phase. The IMU updates could be repeated throughout the survey anytime a complete least squares optimization process is desired and accomplished.

Fundamental to the various improvements in the large volume dimensional metrology measurement survey described above in various configurations is the common use of the special metroprobe 10 which integrates the IMU 18 with a correlated touch probe 20. The IMU itself may be used for constantly and accurately monitoring the angular attitude of the IMU and attached probe 20 within the high accuracy of the gyroscopes which typically have very low gyro bias drift error irrespective of the grade and cost for the IMU.

Such metroprobe 10 provides convenient access to various survey points, some of which might be hidden from the typical line-of-sight requirement for typical CM:Ms.

In the most basic configuration, the accelerometers in the IMU are used in an autonomous mode of operation of the metroprobe for measuring the linear coordinates X,Y,Z of the probe tip as precisely correlated to the reference origin in the IMU, and within the accuracy attributable to the accelerator drift error bias as specified for the IMU.

In an enhanced configuration, the metroprobe 10 is integrated with a CMM in the preferred form of the laser tracker 38 for precisely measuring location of the cooperating target 42, which is precisely correlated to location of the probe tip 22 using the measured attitude of the IMU for in turn precisely measuring location of various survey points, with less regard to partially or fully hidden ones thereof.

Various features of the measurement survey process and apparatus therefor have been disclosed above, and may be used in various combinations and configurations consistent therewith, based on recombining any one or more of the individual features presented in the following claims which are merely representative and not limiting.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A metrology device usable in performing dimensional metrology of an object using a plurality of survey points on the object, comprising:
    an Inertial Measurement Unit (IMU) operable to determine an attitude measurement of said IMU and define a coordinate system in said IMU having an origin based on said attitude measurement of said IMU;
    a sensor attached to said IMU; and
    the metrology device being operable to correlate a position of said sensor based on said attitude measurement of said IMU and being transportable to the plurality of survey points on the object for measuring corresponding coordinates thereof based on said measured attitude of said IMU.

2. The metrology device of claim 1, wherein said sensor is used in determining the location of the plurality of survey points on the object during the measurement survey.

3. The metrology device of claim 1, wherein said sensor is a contact sensor.

4. The metrology device of claim 3, wherein said contact sensor has an outward spherical surface portion, said spherical surface portion being sized for use in contacting any of the plurality of survey points on the object during the measurement survey.

5. The metrology device of claim 1, further including an elongated probe attached to said IMU with said senor located at a distal end of said probe.

6. The metrology device of claim 1, wherein:
    said IMU comprises a plurality of accelerometers and gyroscopes operable to correspondingly define three orthogonal linear axes and three respective angular axes; and
    said IMU correlates a linear position of said sensor to said coordinate system origin based on an angular attitude of said IMU as measured by said gyroscopes.

7. The metrology device of claim 6, wherein said IMU is operable when the metrology device is transported to a reference location to establish at said sensor three linear reference coordinates relative to said three linear axes and three angular reference coordinates relative to said three angular axes.

8. The metrology device of claim 6, wherein said IMU correlates said sensor position to said coordinate system origin based on an angular position of said sensor relative to at least one of said three linear axes, and the metrology device is operable with attitudes ranging from horizontal to vertical.

9. The metrology device of claim 1, wherein:
    said IMU is operable, when the metrology device is transported in a sequential survey of the plurality of survey points on the object, to:
        measure linear positions of said IMU at each of the plurality of survey points on the object;
        measure said attitude of said IMU and correlate therewith an attitude of said sensor at each of the plurality of survey points on the object; and
        establish corresponding linear coordinates of each location of said sensor at each of the plurality of survey points on the object correlated to said measured linear positions of said IMU at each of the plurality of survey points on the object.

10. The metrology device of claim 9, wherein:
    said IMU comprises a plurality of accelerometers and gyroscopes operable to correspondingly define three orthogonal linear axes and three respective angular axes;
    said IMU is operable to measure an angular attitude of said IMU by said gyroscopes; and
    said IMU is operable to measure said linear positions of said IMU by both said accelerometers and said gyroscopes.

11. The metrology device of claim 10, wherein:
    the metrology device is autonomous in performing the dimensional metrology of the object; and
    further includes a controller operatively joined to said IMU, said controller being operable to establish linear coordinates of each location of said sensor at each of the plurality of survey points on the object relative to said three orthogonal linear axes based on said measured angular attitude and linear position of said IMU.

12. The metrology device of claim 11, wherein said IMU is subject to drift errors, and said IMU is operable to correct said linear coordinates at each of the plurality of said survey points on the object to reduce said drift errors.

13. The metrology device of claim 11, wherein:
    when the metrology device is transported between two reference locations when surveying the plurality of survey points on the object, said IMU is operable to establish a position error vector based on a difference in linear positions measured at said two reference locations, and to resolve said position error vector to reduce corresponding errors in said linear coordinates at said survey points on the object.

14. The metrology device of claim 13, wherein:
    said IMU drift errors increase with time during transportation of the metrology device during surveying the plurality of survey points on the object, said IMU is operable to resolve said error vector to correspondingly reduce more error in said linear coordinates at subsequent survey points on the object.

15. The metrology device of claim 12, further comprising:
a stationary cradle upon which the metrology device is positionable at one of said survey points on the object; and
said IMU being operable to introduce a zero velocity update in said IMU to reduce said drift errors in all three linear coordinates for subsequent survey points on the object.

16. A system for performing dimensional metrology of an object, comprising:
a metrology device usable in performing dimensional metrology of an object using a plurality of survey points on the object, comprising:
an Inertial Measurement Unit (IMU) operable to determine an attitude measurement of said IMU and define a coordinate system in said IMU having an origin based on said attitude measurement of said IMU;
a sensor attached to said IMU;
said metrology device being operable to correlate a position of said sensor based on said attitude measurement of said IMU and being transportable to the plurality of survey points on the object for measuring corresponding coordinates thereof based on said measured attitude of said IMU; and
said IMU being operable, when said metrology device is transported in a sequential survey of the plurality of survey points on the object, to:
measure linear positions of said IMU at each of the plurality of survey points on the object;
measure said attitude of said IMU and correlate therewith an attitude of said sensor at each of the plurality of survey points on the object; and
establish corresponding linear coordinates of each location of said sensor at each of the plurality of survey points on the object correlated to said measured linear positions of said IMU at each of the plurality of survey points on the object;
an independent coordinate measurement machine (CMM) having line of sight with said metrology device and being operable to measure a linear positions of said IMU; and
said IMU establishing said linear coordinates of each location of said sensor at each of the plurality of survey points on the object by correlating such to said linear positions of said IMU measured by said CMM.

17. The system of claim 16, wherein said sensor is a contact sensor.

18. The system of claim 17, wherein said contact sensor has an outward spherical surface portion, said spherical surface portion being sized for use in contacting any of the plurality of survey points on the object.

19. The system of claim 16, further including an elongated probe attached to said IMU with said senor located at a distal end of said probe.

20. The system of claim 16, wherein:
said CMM comprises a laser tracker having a variable horizontal and vertical field of view; and the system further comprising:
a cooperating target integrated with said IMU and said sensor; and
a position of said target as measured by said laser tracker being correlated by said IMU to said origin of said coordinate system in said IMU based on said attitude measurement of said IMU to correspondingly establishing said linear position of said IMU and establish said linear coordinates of said sensor at each of the plurality of survey points on the object.

21. The system of claim 20, wherein:
said target comprises a spherically mounted retro-reflector (SMR) mounted to said metrology device; and
said IMU comprises a plurality of accelerometers and gyroscopes operable to correspondingly defining three orthogonal linear axes and three respective angular axes.

22. The system of claim 21, wherein:
said laser tracker is operable to measure a linear position of said target when in line-of-sight therewith and said IMU is operable to in turn establish said linear coordinates of said sensor as correlated with said target; and
said IMU is operable to measure said linear position of said IMU using said accelerometers when line-of-sight of said laser tracker with said target is blocked to in turn establish said linear coordinates of said sensor as correlated with said IMU.

23. The system of claim 21, wherein:
said IMU is operable to measure said attitude of said IMU using said gyroscopes to correlate with attitudes of both said sensor and said target.

24. The system of claim 21, further comprising:
a stationary cradle upon which said metrology device is positionable at one of said survey points on the object when line-of-sight of said laser tracker with said target is blocked; and
said IMU being operable to introduce a zero velocity update in said IMU to reduce drift errors in all three linear coordinates for sequential survey points on the object during which line-of-sight to said laser tracker with said target is also blocked.

25. The system of claim 21, further comprising:
a controller operatively connected to said laser tracker and said IMU, said controller being operable to control said laser tracker to follow movement of said target based on said measured linear position of said IMU obtained by using said accelerometers and correlating said position of said target to said measured linear position of said IMU.

26. The system of claim 21, wherein:
said target comprises a multiaxis motorized SMR pivotally mounted to said IMU;
the system further comprising:
a controller operatively connected to said laser tracker, said target and said IMU, said controller being operable to automatically track said laser tracker to said target and automatically back-tracking said target to said laser tracker in response to a correlated position of said target relative to said position and attitude of said IMU.

27. The system of claim 21, further comprising:
a second IMU integrated with said laser tracker, said laser tracker being operable to measure a position and an attitude of said second IMU, and when conducting a survey using said laser tracker at two different reference locations having line-of-sight with a plurality of common survey points, said laser tracker being operable to measure said coordinates thereof; and
said second IMU being operable to perform a least squares iterative optimization process using said position and attitude of said second IMU at said two different reference locations, and said measured coordinates at said common survey points to conform all measurements from said laser tracker to a common coordinate reference system.

28. A system for performing dimensional metrology of an object comprising:
a metrology device comprising an Inertial Measurement Unit (IMU) integrated with a sensor;
a controller operatively joined to said IMU for controlling operation thereof;
said controller being configured to correlate a position and an attitude of said sensor to a reference coordinate system in said IMU; and
said metrology device being configured for establishing coordinates of said sensor at a plurality of survey locations on the object based on said attitude of said IMU as measured by said IMU.

29. The system of claim 28, wherein said sensor is a contact sensor.

30. The system of claim 29, wherein said contact sensor has an outward spherical surface portion, said spherical surface portion being sized for use in contacting any of the plurality of survey points on the object during the measurement survey.

31. The system of claim 28, further including an elongated probe attached to said IMU with said senor located at a distal end of said probe.

32. A metrology device usable in performing dimensional metrology of an object using a plurality of survey points on the object, comprising:
an Inertial Measurement Unit (IMU) operable to determine an attitude measurement of said IMU and define a coordinate system in said IMU having an origin based on said attitude measurement of said IMU;
a sensor attached to said IMU having an offset length from said origin of said coordinate system in said IMU; and
the metrology device being operable to correlate a position of said sensor based on said attitude measurement of said IMU and being transportable to the plurality of survey points on the object for measuring corresponding coordinates thereof based on said measured attitude of said IMU.

33. The metrology device of claim 32, wherein said sensor is used in determining the location of the plurality of survey points on the object during the measurement survey.

34. The metrology device of claim 32, wherein said sensor is a contact sensor.

35. The metrology device of claim 34, wherein said contact sensor has an outward spherical surface portion, said spherical surface portion being sized for use in contacting any of the plurality of survey points on the object during the measurement survey.

36. The metrology device of claim 32, further including an elongated probe attached to said IMU with said senor located at a distal end of said probe.

37. The metrology device of claim 32, wherein:
said IMU comprises a plurality of accelerometers and gyroscopes operable to correspondingly define three orthogonal linear axes and three respective angular axes; and
said IMU correlates a linear position of said sensor to said coordinate system origin based on an angular attitude of said IMU as measured by said gyroscopes.

38. The metrology device of claim 37, wherein said IMU correlates said sensor offset position to said coordinate system origin based on an angular position of said sensor relative to at least one of said three linear axes, and the metrology device is operable with attitudes ranging from horizontal to vertical.

39. A system for performing dimensional metrology of an object, comprising:
a metrology device usable in performing dimensional metrology of an object using a plurality of survey points on the object, comprising:
an Inertial Measurement Unit (IMU) operable to determine an attitude measurement of said IMU and define a coordinate system in said IMU having an origin based on said attitude measurement of said IMU;
a sensor attached to said IMU having a first offset length from said origin of said coordinate system in said IMU;
said metrology device being operable to correlate a position of said sensor based on said attitude measurement of said IMU and being transportable to the plurality of survey points on the object for measuring corresponding coordinates thereof based on said measured attitude of said IMU; and
said IMU being operable, when said metrology device is transported in a sequential survey of the plurality of survey points on the object, to:
measure linear positions of said IMU at each of the plurality of survey points on the object;
measure said attitude of said IMU and correlate therewith an attitude of said sensor at each of the plurality of survey points on the object; and
establish corresponding linear coordinates of each location of said sensor at each of the plurality of survey points on the object correlated to said measured linear positions of said IMU at each of the plurality of survey points on the object;
an independent coordinate measurement machine (CMM) having line of sight with said metrology device and being operable to measure a linear positions of said IMU; and
said IMU establishing said linear coordinates of each location of said sensor at each of the plurality of survey points on the object by correlating such to said linear positions of said IMU measured by said CMM.

40. The system of claim 39, wherein said sensor is a contact sensor.

41. The system of claim 40, wherein said contact sensor has an outward spherical surface portion, said spherical surface portion being sized for use in contacting any of the plurality of survey points on the object.

42. The system of claim 39, further including an elongated probe attached to said IMU with said senor located at a distal end of said probe.

43. The system of claim 39, wherein:
said CMM comprises a laser tracker having a variable horizontal and vertical field of view; and
the system further comprising:
a cooperating target integrated with said IMU and said sensor, and said target having a second offset length from said origin of said coordinate system in said IMU; and
a position of said target as measured by said laser tracker being correlated by said IMU to said origin of said coordinate system in said IMU based on said attitude measurement of said IMU to correspondingly establishing said linear position of said IMU and establish said linear coordinates of said sensor at each of the plurality of survey points on the object.

44. The system of claim 43, wherein:
said target comprises a spherically mounted retro-reflector (SMR) mounted to said metrology device; and said IMU comprises a plurality of accelerometers and gyroscopes operable to correspondingly defining three orthogonal linear axes and three respective angular axes.

45. The system of claim 44, wherein:

said IMU is operable to measure said attitude of said IMU using said gyroscopes to correlate with attitudes of both said sensor and said target, said sensor and said target having corresponding offset lengths, to correlate said linear position of said sensor to said origin of said coordinate system in said IMU.

46. A system for performing dimensional metrology of an object comprising:

a coordinate measurement machine laser tracker having a variable horizontal and vertical field of view;

a metrology device including an inertial measurement unit integrated with both a sensor and a spherically mounted retro-reflector target;

a controller operatively joined to said laser tracker and said IMU for controlling operation thereof;

said controller being configured to correlate position and attitude of both said sensor and said target to a reference coordinate system in said IMU; and said laser tracker being configured in conjunction with said metrology device for establishing coordinates at said sensor at a plurality of survey locations on said object based on location of said target as measured by said laser tracker and based also on attitude of said IMU as measured by said IMU.

* * * * *